United States Patent [19]

Mizuki

[11] Patent Number: 5,623,675

[45] Date of Patent: Apr. 22, 1997

[54] PRINTING SYSTEM, AND METHOD OF RECEIVING AND PROCESSING INTERRUPT REQUEST IN PRINTER

[75] Inventor: Toshie Mizuki, Yokohama, Japan

[73] Assignee: Ricoh Company, Ltd., Tokyo, Japan

[21] Appl. No.: 580,772

[22] Filed: Dec. 29, 1995

Related U.S. Application Data

[63] Continuation of Ser. No. 135,565, Oct. 14, 1993, abandoned.

[30] Foreign Application Priority Data

Oct. 27, 1992 [JP] Japan .................................. 4-311339

[51] Int. Cl.$^6$ .................................................. G06F 11/30
[52] U.S. Cl. ........................................... 395/733; 395/101
[58] Field of Search ..................................... 395/726, 113, 395/112, 101, 106, 733; 364/519

[56] References Cited

U.S. PATENT DOCUMENTS

| | | | |
|---|---|---|---|
| 3,789,365 | 1/1974 | Jen et al. | 395/275 |
| 3,825,902 | 7/1974 | Brown et al. | 395/725 |
| 4,764,869 | 8/1988 | Miyazaki et al. | 395/725 |
| 4,858,171 | 8/1989 | Furusawa et al. | 364/419.1 |
| 4,953,103 | 8/1990 | Suzaki | 364/519 |
| 4,967,342 | 10/1990 | Lent et al. | 395/725 |
| 5,018,079 | 5/1991 | Shukunami | 364/519 |
| 5,050,098 | 9/1991 | Brown, III et al. | 364/519 |
| 5,058,037 | 10/1991 | Kageyama et al. | 364/519 |
| 5,148,286 | 9/1992 | Knodt et al. | 358/296 |
| 5,206,735 | 4/1993 | Gauronski et al. | 358/296 |
| 5,235,676 | 8/1993 | Clay et al. | 395/113 |
| 5,245,368 | 9/1993 | Farrell et al. | 358/401 |
| 5,274,834 | 12/1993 | Kardach et al. | 395/800 |
| 5,287,194 | 2/1994 | Lobiondo | 358/296 |
| 5,299,296 | 3/1994 | Padalino et al. | 395/112 |

FOREIGN PATENT DOCUMENTS 0529808  3/1993  European Pat. Off. .

Primary Examiner—Ayaz R. Sheikh
Attorney, Agent, or Firm—Lowe, Price, LeBlanc & Becker

[57] ABSTRACT

A data storing unit temporarily stores data associated with a first job currently being dealt with. An interruption function control unit makes data associated with the first job currently being dealt with in response to a reception of an interruption request. The interruption function control unit reads the data stored in the data storing unit after a second job associated with the interruption request has been finished. The read data is then used for dealing with the first job.

22 Claims, 4 Drawing Sheets

PRINTING SYSTEM, AND METHOD OF RECEIVING AND PROCESSING INTERRUPT REQUEST IN PRINTER

This application is a continuation of application Ser. No. 08/135,565 filed Oct. 14, 1993, now abandoned.

BACKGROUND OF THE INVENTION

The present invention relates to a data processing apparatus and in particular relates to a data processing apparatus having a function responsive to an interruption request. An example of such a data processing apparatus comprises a printer controller for controlling a printer coupled to a plurality of host systems.

Network systems such as a so-called UNIX (a multiuser, multitasking operating system for use on minicomputers) have been recently developed. Such development of network systems enables that any of a plurality of users may use an arbitrary printer. In such an environment, a possibility of flexible management of a relevant network is remarked. It is expected that such flexible management achieves smooth and optimum printing-out works (for making relevant documents) being carried out by users. Such flexible management may be achieved by bi-directional communication between a printer and a host such as a printer server.

A printer controller according to related art will now be described. This printer controller is used so as to control a printer coupled to a plurality of host systems. There may be a case where these respective host systems give a plurality of jobs (for printing out corresponding documents) to this printer at a time. In such a case, the printer controller makes the printer carry out a job which was given first, the printer thus printing out a document associated with this job. The remaining jobs among the at-a-time-given plurality of jobs are registered onto a list according to a sequence in which the jobs were given. Then, the printer controller makes the printer carry out these jobs according to the sequence in which the jobs were registered in the list (a first-in-first out (FIFO) queue).

There is a problem in such a manner as mentioned above, in which manner a plurality of jobs are handled by the printer controller according to the related art. The problem occurs in a special case where a printing-out work is requested urgently or another special case where only one page is requested to be printed out. In such special cases, these requests are handled similarly to other printing out requests. Thus, these requests associated with such special cases are first registered in the list and then it is to be awaited for their turns to come round. Alternatively, a user who intends to carry out one of these special jobs should ask another user whose job is currently being dealt with to stop dealing with the job so that the user intending to carry out the special job may be allowed to carry out his or her job. Such a way as asking the other user is a troublesome problem.

SUMMARY OF THE INVENTION

An object of the present invention is to provide a data processing apparatus properly responsive to a situation such as mentioned above, for example, page printing work being requested urgently or single-page printing work being requested.

To achieve the object of the present invention, a data processing apparatus according to the present invention comprises:

data storing means for temporarily storing data associated with a first job currently being dealt with; and interruption function control means for making data associated with a first job currently being dealt with in response to a reception of an interruption request, wherein said interruption function control means reads said data stored in said data storing means after a second job associated with said interruption request has been finished, the read data being used for dealing with said first job.

By this construction, the interruption control means, in response to the reception of the interruption request, halts the first job currently being dealt with. Then, the interruption function control means stores necessary data associated with the first job currently being dealt with in the data storing means. Then, after the second job associated with the interruption request has been finished, the interruption function control means again reads the data associated with the first job, which data was stored in the data storing means at the time of the receipt of the interruption request. Then, the read data is used for carrying out the first job which was dealt before the reception of the interruption request.

Such a function as mentioned above is properly responsive to a situation such as mentioned above, for example, page printing work being requested urgently or single-page printing work being requested. Thus, a data processing apparatus such as a printer controller can be realized, which apparatus has an improved convenience and enables efficient management thereof.

Other objects and further features of the present invention will become more apparent from the following detailed description when read in conjunction with the accompanying drawings.

DESCRIPTION OF THE PREFERRED EMBODIMENTS

Figure 1:
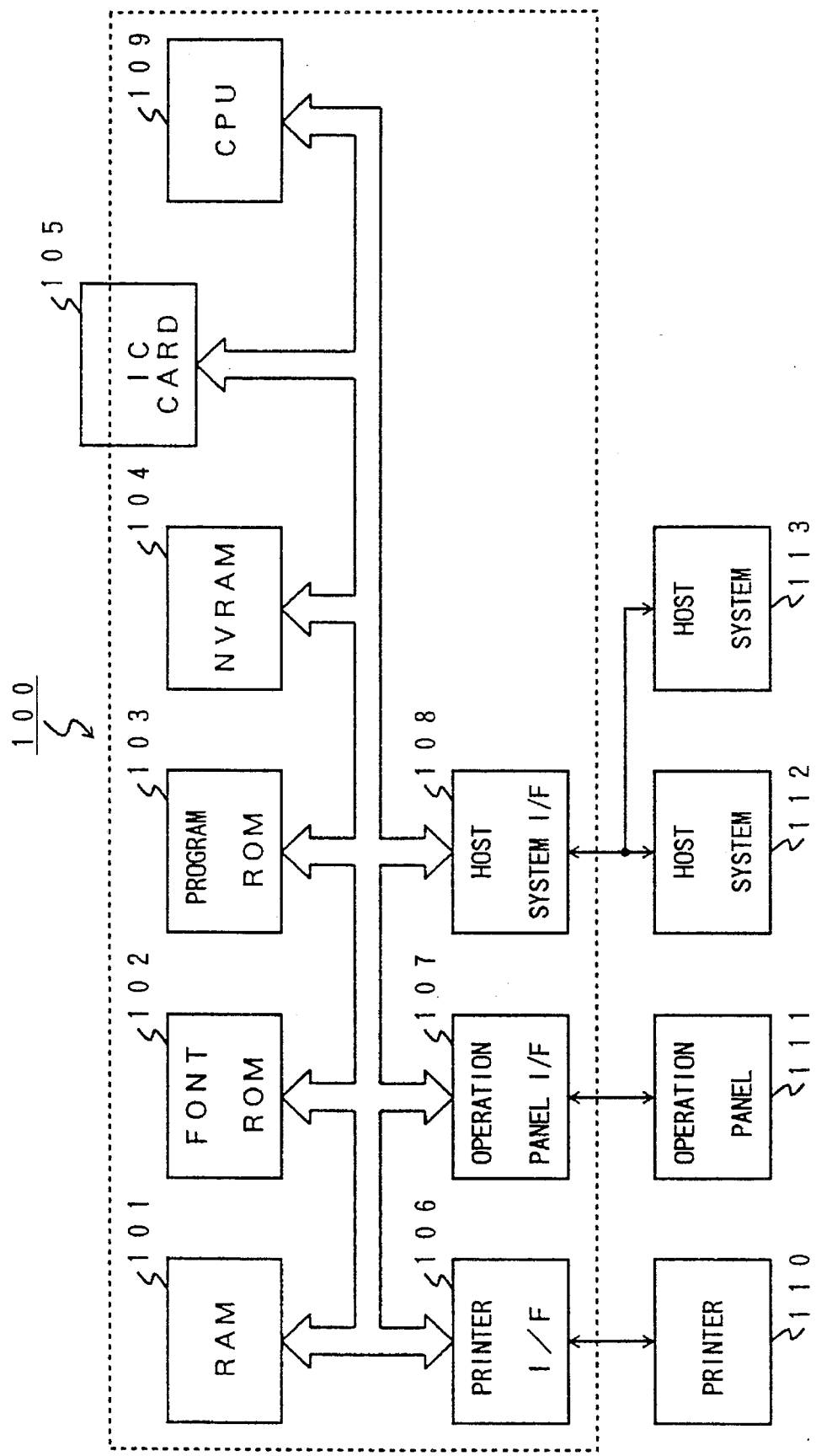
FIG. 1 shows a block diagram of a printer controller of a first embodiment of a data processing apparatus according to the present invention.

A printer controller 100 of a first embodiment of a data processing apparatus according to the present invention will now be described with reference to FIG. 1.

The printer controller 100 comprises a RAM 101 to be used as a memory for storing data as necessary in carrying out various types of work. The printer controller 100 also comprises a font ROM 102 for storing pattern data associated with fonts, a program ROM 103 for storing control programs. The printer controller 100 also comprises NVRAM 104 comprised of a non-volatile memory for storing information such as contents of mode specifications from a operation panel 111.

The printer controller 100 also comprises an IC (Integrated Circuit) card 105 for supplying information such as font data and/or programs from outside of the apparatus 100.

The printer controller 100 also comprises a printer I/F (interface) 106 for carrying out data communication as to commands, status, and printing-out data between a printer 110 and the printer controller 100. The printer controller 100 also comprises a operation-panel I/F (interface) 107 for carrying out data communication as to commands, and status between the operation panel 111 and the printer controller 100. The printer controller 100 also comprises a host I/F (interface) 108 for carrying out data communication between host systems 112 and 113 and the printer controller 100.

The printer controller 100 also comprises a CPU (Central Processing Unit) 109 for control of each component mentioned above in the printer controller 100. The CPU 109 carries out such control work, using the control program stored in the program ROM 103, according to a mode specification input through the operation panel 111, and/or according to commands sent from the host systems 112 and 113.

In FIG. 1, the printer 110 is used for actually printing out documents. The operation panel 111 is used for a current condition in the printer 110 or for inputting mode specifications. The respective host systems 112 and 113 act as higher-level units for the printer 110 in the hierarchy comprising the host systems 112 and 113 and the printer 110. A number of host systems to be coupled to the printer 110 through the printer controller 100 is not limited to two as in the embodiment of the printer controller 100. The number of the host systems may be a number more than two such as three, four, . . .

In this embodiment, storing means to be used at a time of reception of an interruption request comprises the RAM 101. For this purpose, the RAM 101 is provided with a file area, page area and mode area. The file area is used for storing data, received after the reception of the interruption request, associated with a job currently being dealt with by the printer controller 100. The page area is used for storing page information or bit-map information associated with the job currently being dealt with, which information is unfinished at the time of the reception of the interruption request. That is, the information to be stored in the page area comprises a part of finished page information or finished bit-map information, which part has been already finished by the time of the interruption-request reception. This finished page information or bit-map information is being processed by the printer controller 100 at the time of the interruption-request reception.

The above-mentioned mode area is used for storing information concerning a condition of the printer 110 or printer's mode information which is applied at the time of the interruption request reception.

An operation flow of an interruption process carried by the printer controller 100 having the above-mentioned construction will now be described with reference to FIG. 2.

Figure 2:
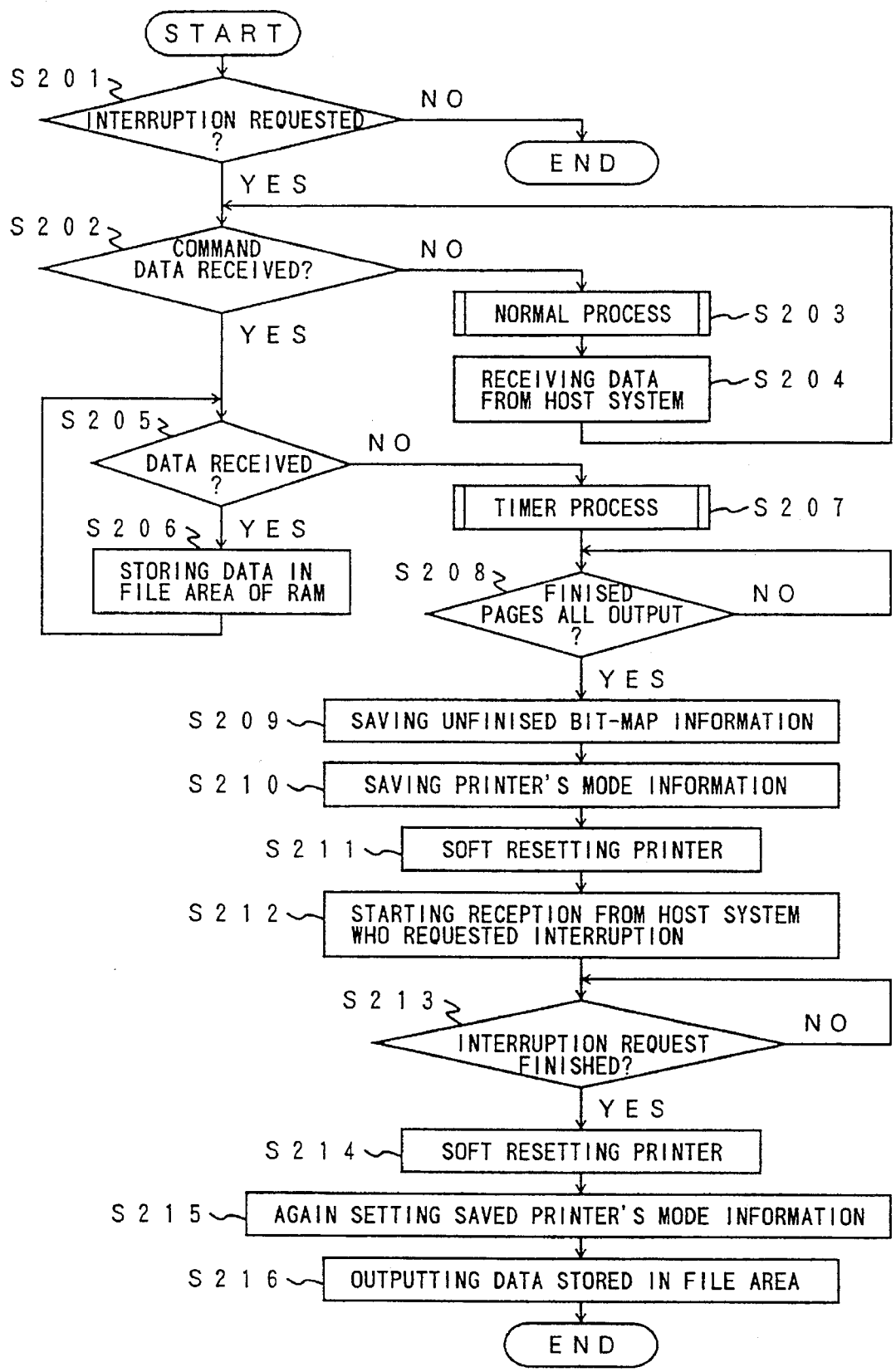
FIG. 2 shows an operation flow of an interruption process carried out by the printer controller of FIG. 1.

The CPU 109 constantly executes a first step of the series of interruption-process operation shown in FIG. 2 periodically with a predetermined time interval while the printer 110 executes a printing operation according to a relevant request from one of the host systems 112 and 113. The operation flow of FIG. 2 will now be described with an example where the printer controller 100 executes a job given by the host system 112.

First, in a step 201 (the term step will be referred to as simply S hereinafter), it is determined whether or not any interruption request is given by one of the host systems 112 and 113. If no interruption request is given in S201, the interruption process at the relevant time is finished.

If an interruption request is given in S201, the reception of data from the host system 112 is continued until reception of an advanced end of any command is confirmed, in S202, S203 and S204. In these steps, the received data is then passed through and sent to the printer 110. The printer 110 then processes the sent data as usual.

When reception of an advanced end of a command is confirmed in S202, all of data received after the reception of the advanced end of the command is stored in the file area of the RAM 101 in S205 and S206.

When no data is received in S205, a timer process is executed in S207. This timer process will now be described with FIG. 3. In the timer process, first a timer is started in S301. If no data is received from the host system 112 when the timing by means of the timer has been finished in S302, the following determination is carried out. That is, it is determined that data to be sent from the host system 112 at the relevant time had been finished by the latest reception of data from the host system 112. Then, the timer process is finished in S303.

If data is received when the timing by means of the timer has been finished in S302, the received data is stored in the file area of the RAM 101 in S304. Then, S301 is again initiated so as to initiate the timer and the subsequent steps starting from S302 are then executed.

Subsequently, in the series of operation of FIG. 2, after all finished pages existing in the printer 110 are printed out (this finishing is determined in S208), unfinished page information or bit-map information is saved or stored in the page area of the RAM 101 in S209. This information to be stored in the page area comprises information which is unfinished at the time of the reception of the interruption request. That is, the information to be stored in the page area comprises a partly finished page information or partly finished bit-map information, which part has been already finished by the time of the interruption-request reception. This finished page information or bit-map information is being processed by the printer controller 100 at the time of the interruption-request reception.

Then, in S210, information concerning a condition of the printer 110 or printer's mode information which is applied at the time of the interruption-request reception is stored in the mode area of the RAM 101.

Then, soft resetting is executed in the printer 110 in S211. (The term soft resetting hereinafter means resetting the relevant software so as to delete the precedingly set software condition. As a result, other data setting may be carried out in the printer software.) Then reception of data from the host system 113 which emitted the relevant interruption request is performed in S212.

When data sending associated with the relevant interruption request from the host system 113 has been finished in S213, then it is determined that the printing operation associated with the relevant interruption request has been finished. Then, in S214, soft resetting is executed in the printer 110. Then in S215, the information concerning printer condition, which information was saved in the mode area of the RAM 101 in S210, is then set on the printer 110 so as to realize the condition of the printer 110, in which condition the printer 110 was at the time of the receipt of the relevant interruption request.

Then in S216, the data stored in the file area of the RAM 101 in S206 and/or S304 is sent to the printer 110 so that this sent data is used for printing out the relevant document. This sent data comprises the data associated with the job which was dealt with at the time of the reception of the relevant interruption request.

Then when all the relevant data has been printed out, this cycle of the interruption process is finished.

Figure 3:
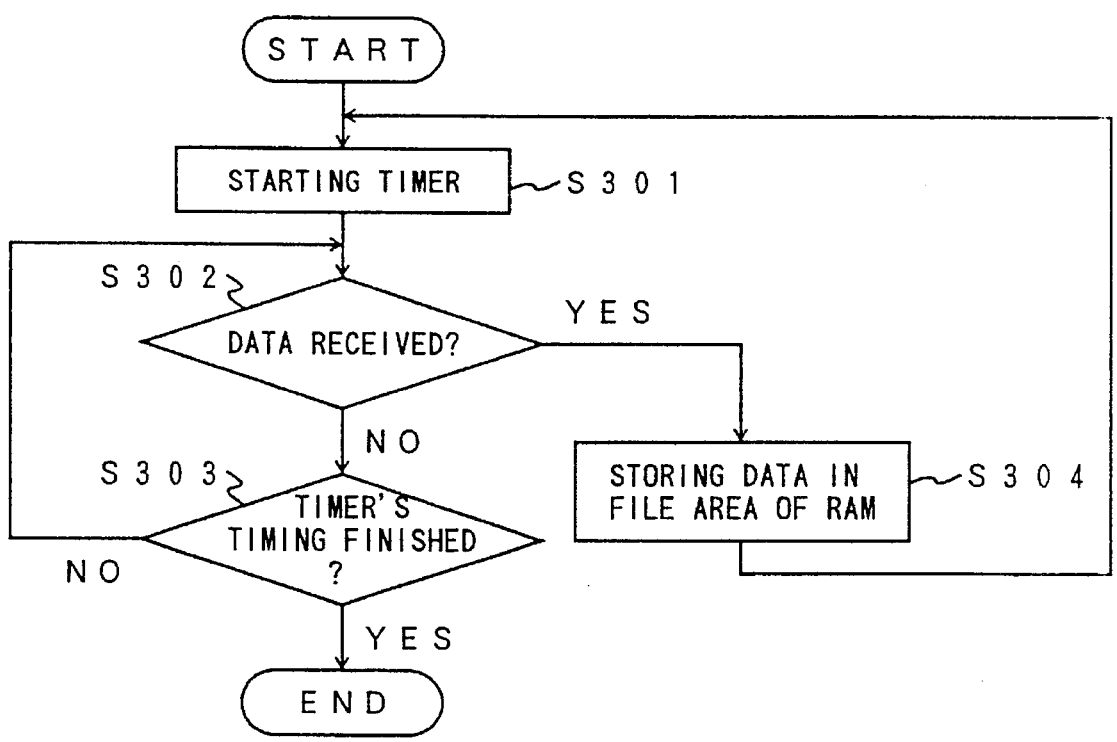
FIG. 3 shows an operation flow of a timer process included in the operation flow of FIG. 2.

The function associated with the above mentioned operation of FIGS. 2 and 3 properly responsive to a situation such as mentioned above where, for example, a page printing out work is requested urgently or single-page printing out work is requested while the printer 110 is being used for another printing-out work. Such a response may be initiated by the relevant interruption request sent from the relevant host system. Thus, the printer controller 100 according to the present invention enables achievement of user-friendly printer management.

A printer controller of a second embodiment of a data processing apparatus according to the present invention will now be described.

The printer controller of the second embodiment enables shortening of the series of process starting from the printing-out operation associated with the interruption request and ending at the restoration of the condition of the printer 110 to that being at the time of the reception of the relevant interruption request. The block diagram of the printer controller of the second embodiment is the same as that of the first embodiment shown in FIG. 1. Consequently, indication of the block diagram and description thereof are eliminated for the second embodiment.

An operation flow of an interruption process carried out by the printer controller of the second embodiment will now be described with reference to FIG. 4. Basic flow of the operation flow is similar to that of the first embodiment shown in FIG. 2. The steps to which the same step numerals are given are the same steps between FIG. 2 and FIG. 4. In the description of the operation flow of FIG. 4, parts which are different from the corresponding parts in the operation flow of FIG. 2 will be described in detail. Further, description of some of the steps which are the same as those of FIG. 2 will be omitted.

First, in a S201, it is determined whether or not any interruption request is given by one of the host systems 112 and 113. If no interruption request is given in S201, the interruption process at the relevant time is finished.

If an interruption request is given in S201, the reception of data from the host system 112 is continued until reception of a termination command, such as a command indicating starting another page, is confirmed, in S401, S203 and S204. In these steps, the received data is then passed through and sent to the printer 110. The printer 110 then processes the sent data as usual.

On reception of such a termination command in S401, all of data received after the reception of the advanced end of the termination command is stored in the file area of the RAM 101 in S205 and S206.

After the timer process is executed in S207, after all finished pages exist in the printer 110 are printed out (this finishing is determined in S208), then in S210, information concerning a condition of the printer 110 or printer's mode information which is applied at the time of the interruption request reception is stored in the mode area of the RAM 101.

Figure 4:
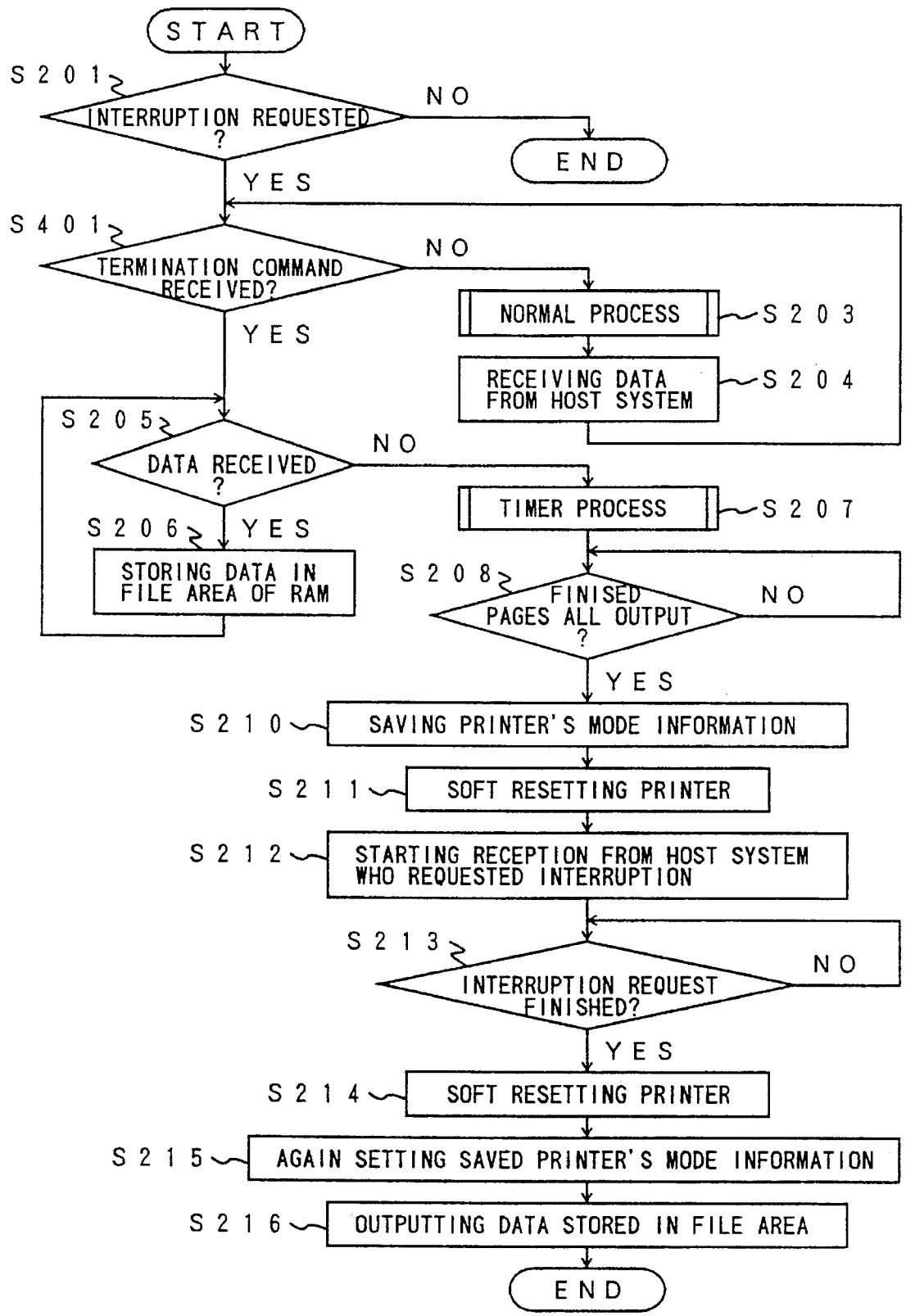
FIG. 4 shows an operation flow of an interruption process carried out by a printer controller of a second embodiment of a data processing apparatus according to the present invention.

In the series of operation of FIG. 4, there is no unfinished page information and all pages have been finished at the time when S208 has been finished. This is because the processing for the job dealt with at the time of the reception of the relevant interruption request continued until the time of the reception of the termination command in S401. As a result, in the second embodiment, S209 where unfinished page information or bit-map information is saved in the page area of the RAM 101 may be omitted in comparison with the first embodiment.

The function associated with the above mentioned operation of FIG. 4 enables a speedy printing operation associated with an interruption request being carried out by a user even while another user is printing out a document. Further, it is also possible to shorten the process to be executed, after the completion of the printing-out operation associated with the relevant interruption request, so as to restore a condition of the printer to that being at the time of the reception of the relevant interruption request.

Further, the present invention is not limited to the above described embodiments, and variations and modifications may without departing from the scope of the present invention.

What is claimed is:

1. A printing system comprising:

a) storing means for storing first-Job data when an interrupt request is received while performing a first print job, wherein:

1) the first-job data includes:

i) image information which is currently being processed into a plurality of places of page information for the first print job, each piece of page information representing a corresponding printed page, the processing of which into a piece of page information is unfinished at the time at which the interrupt request is received; and ii) state information indicating a current state of a printer which is to print the image information; and 2) the interrupt request constitutes a request to perform a second job by interrupting processing of the image information for the first print job and causing the printer to print all of the pages represented by the corresponding pieces of page information which have already been completely processed from the image information of the first-job data before the interrupt request is received; and b) control means, connected to the storing means, for reading the stored first-job data after the second job is performed, to allow the first-job data to then be used for continuing to perform the first print job.

2. The printing system of claim 1, wherein:

the state information indicates a mode in which the printer operates.

3. A printing system as recited in claim 2, wherein said control means is connected to and controls said printer according to a mode specification input through said operation panel and/or commands sent from one of said host systems.

4. A printing system as recited in claim 2, wherein, when said interrupt request is received, said control means stores said image information in a file area of said storing means and then stores said state information indicating a mode of the printer in a mode area of said storing means.

5. A printing system as recited in claim 4, wherein said control means resets said printer in response to a command from said printer indicating that the second print job has been finished and then sets the software conditions of said printer according to said state information stored in said mode area of said storing means.

6. The printing system of claim 1, wherein:

the image information includes original data received in a serial data format from a host system which is connected to the printing system.

7. The printing system of claim 6, wherein:

the original data includes data received after the interrupt request is received.

8. The printing system of claim 1, wherein:

the first-job data stored by the storing means includes image data in a serial data format received after a termination command is received.

9. The printing system of claim 8, wherein:

the termination command includes a command indicating that information to be in a currently formed page is finished.

10. The printing system of claim 1, wherein:

the printing system is connected with plural host systems.

11. The printing system of claim 10, wherein the interrupt request is received from one of said plural host systems.

12. The printing system of claim 10, wherein said first print job is received from a first one of said plural host systems, said second job is received from a second one of said plural host systems and said interrupt request is received from said second one of said plural host systems.

13. The printing system of claim 12, wherein said printing system comprises a host system interface and, when said interrupt request is received while said image information for the first print job is being received, the host system interface commences bidirectional communication with at least one of said plural host systems.

14. The printing system of claim 1, wherein said control means comprises an interruption function control unit which obtains said state information in response to said interruption request.

15. The printing system of claim 1, further comprising an operation panel and a non-volatile memory which stores mode specifications of said operation panel.

16. A printing system as recited in claim 1, wherein said control means controls said printer via a printer interface which carries out hi-directional communication of commands to and from the printer and data as to the status of the printer.

17. A method of receiving and processing an interrupt request in a printer to interrupt a first print job from a first host system, said method comprising the steps of:

periodically determining whether an interrupt request has been received;

if it is determined that an interrupt request has not been received, receiving image data for said first print job from said first host system and/or processing said image data into pieces of page information respectively corresponding to pages to be printed;

performing the following steps if it is determined that an interrupt request has been received:

(1) printing out all pages corresponding to pieces of page information, the processing of which from said image data for said first print job have already been finished before the interrupt request is received, (2) storing image data received from said first host system at the time of said interrupt request in a file area of a random access memory, (3) interrupting the processing and printing of image data for said first print job from said first host system, (4) saving page information, the processing of which into a piece of page information is unfinished at the time of said interrupt request, in the page area of the random access memory, and (5) saving mode information of the printer at the time of the interrupt request in a mode area of said random access memory;

receiving image data for a second print job from a second host system;

printing the image data received from said second host system for the second print job;

when said second print job is finished, resetting software conditions of said printer according to the printer's mode information saved at the time of the interrupt request; and printing the image data from said first host system stored in said file area of said random access memory in response no said interrupt request.

18. The method of claim 17, in which the step of interrupting the processing of image data for said first print job from said first host system occurs upon the reception of a termination command and in which all of the image data received from said first host system after reception of the termination command is stored in the file area of said random access memory.

19. The method of claim 17, in which the step of storing image data received from said first host system at the time of said interrupt request in the file area of said random access memory continues so long as said image data is received and which further comprises a timer process which is executed when said image data is no longer being received, said timer process comprising the steps of:

starting a timer;

detecting whether image data is received during the time period set by said timer;

if image data is received during the time period set by said timer, storing said image data in the file area of said random access memory and restarting the timer; and if image data is not received during the time period set by said timer, ending the timer process.

20. The method of claim 17, wherein the step of resetting software conditions of said printer according to the printer's mode information saved at the time of the interrupt request comprises the substeps of first resetting the printer and then setting the printer according to the printer's mode information.

21. The method of claim 17, wherein the method comprises an additional step of resetting the software conditions of said printer, said additional step of resetting being performed subsequent to the step of saving mode information of the printer at the time of the interrupt request and prior to the step of receiving image data for a second print job.

22. The method of claim 17, wherein the method comprises a step of setting software conditions of said printer according to a mode specification input through said operation panel and/or commands sent from one of said host systems.

* * * * *